US007085575B2

(12) United States Patent
Fabien et al.

(10) Patent No.: US 7,085,575 B2
(45) Date of Patent: Aug. 1, 2006

(54) POWER ALLOCATION METHOD FOR MULTICAST SERVICES

(75) Inventors: Jean-Aicard Fabien, Lincolnshire, IL (US); Amitava Ghosh, Buffalo Grove, IL (US); Rapeepat Ratasuk, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 308 days.

(21) Appl. No.: 10/643,816

(22) Filed: Aug. 18, 2003

(65) Prior Publication Data
US 2005/0043033 A1 Feb. 24, 2005

(51) Int. Cl.
*H04Q 7/20* (2006.01)
*H04B 7/00* (2006.01)

(52) U.S. Cl. .............. 455/452.1; 455/518; 455/522; 455/450

(58) Field of Classification Search ........ 455/450, 455/518, 519, 520, 522, 452.1, 452.2
See application file for complete search history.

(56) References Cited

U.S. PATENT DOCUMENTS

| 5,870,393 | A | * | 2/1999 | Yano et al. ............. 370/335 |
| 5,881,368 | A | * | 3/1999 | Grob et al. .............. 455/69 |
| 6,023,625 | A | * | 2/2000 | Myers, Jr. ............... 455/503 |
| 6,542,755 | B1 | | 4/2003 | Tsukagoshi |
| 2002/0037729 | A1 | * | 3/2002 | Kitazawa et al. .......... 455/452 |
| 2003/0012217 | A1 | * | 1/2003 | Anderson et al. ......... 370/437 |
| 2003/0119452 | A1 | * | 6/2003 | Kim et al. ............... 455/69 |
| 2003/0134655 | A1 | * | 7/2003 | Chen et al. .............. 455/522 |
| 2003/0207696 | A1 | * | 11/2003 | Willenegger et al. ....... 455/522 |
| 2004/0106423 | A1 | * | 6/2004 | McGowan et al. ......... 455/522 |
| 2004/0116125 | A1 | * | 6/2004 | Terry ..................... 455/450 |
| 2004/0203336 | A1 | * | 10/2004 | Sinnarajah et al. ....... 455/3.01 |

FOREIGN PATENT DOCUMENTS

WO     WO 03/017523 A1    2/2003

OTHER PUBLICATIONS

"3rdGeneration Partnership Project; Technical Specification Group Radio Access Network; Introduction of the Multimedia Broadcast Multicast Service (MBMS) in the Radio Access Network (Stage-2); (Release 6)", Global System for Mobile Communications, 3GPP TS 25.346 V0.5.0 (Mar. 2003), pp. 1-17.

(Continued)

*Primary Examiner*—Charles N. Appiah
*Assistant Examiner*—Bryan Fox
(74) *Attorney, Agent, or Firm*—Frank J. Bogacz; Kevin D. Wills

(57) ABSTRACT

In a mobile telecommunication system (10), a number of user equipments (40–45) may receive multimedia broadcast multicast services. The method for power allocation and user assignment for MBMS services determines any number (K) of user equipments which may be served without complete cell area coverage (78). For more than K user equipments (40–45) requesting MBMS services, dedicated channels are assigned (84). For user equipments requesting MBMS service during a broadcast, such user equipment is assigned to the channel (broadcast or dedicated) with the lower power requirement, if power is available. If the user is assigned to the broadcast channel, and power is available, power of the broadcast channel is adjusted (108). Otherwise, the power of the broadcast channel is increased and no further power is indicated as being available (112).

2 Claims, 5 Drawing Sheets

OTHER PUBLICATIONS

"Power Usage for Mixed FACH and DCH for MBMS", Lucent Technologies, 3GPP TSG RAN WG 1#28bis, R1-02-1240, 8-9 Oct. 2002, Espoo, Finland.

"Power Requirement for Common vs. Dedicated Channel", Motorola, TSG-RAN Working Group 1 meeting #4, TSGR1#3(99)382, Mar. 19-20, 1999, Shin Yokohama.

* cited by examiner

POWER ALLOCATION METHOD FOR MULTICAST SERVICES

BACKGROUND OF THE INVENTION

The present invention pertains to power management within mobile telecommunication systems and more particularly for multicast services.

Mobile telecommunication systems transmit information wirelessly over the air. Power for the transmitted signals is a driving consideration in today's mobile telecommunication services, since the power varies with the distance between the mobile telecommunication station and the user's equipment.

Today multimedia multicast services, which are broadcast wirelessly, require large amounts of power by the telecommunication stations. Typically in such wireless telecommunication systems, common channels are used for system based information and signaling messages to all users. In third generation (3G) telecommunication systems, common channels are being considered for high speed data traffic on the downlink for point-to-multipoint communication in order to provide multimedia broadcast multicast services (MBMS).

Common or broadcast channels are not power controlled and a fixed amount of power is allocated by the Radio Network Controller to provide 95–98% area coverage of the entire cell. Further, not all mobile users within the cell subscribe to broadcast services. However, mobile users requiring multicast services may be anywhere within the cell. Therefore, coverage for multicast services within the cell must be extended to the edges of the cell. The main advantage of using a broadcast channel is that all users inside the coverage area are automatically covered.

In one possible approach, the Radio Network Controller (RNC) counts the number of mobile users within a cell who are subscribed to multimedia services. If the number of such mobile users in the cell is below a threshold, multimedia services are provided using—dedicated radio channels. Otherwise, the services are provided using the broadcast channel for 98% area coverage reliability regardless of where the mobile users are located and whether these users are subject to fading conditions. When the broadcast channel is used, there must be sufficient power for the broadcast channel to provide multicast services for the coverage of the entire cell. Simulation and field test results show that for 98% area coverage reliability, that approximately 15% of the base station power should be allocated to the common channel for data rates of 64 kbps at 1% frame erasure rate. For a 128 kilobits per second data transfer rate, more than 30% of the total power of the base station should be allocated to the common channel.

As a result, it would be advantageous to have a multimedia service implementation where only a subset of the users is served by the broadcast channel with the remainder served by dedicated channels. Partial cell coverage reduces the required broadcast channel power significantly, while the remaining users, when selected appropriately, are better served via dedicated channels.

Accordingly, it would be highly desirable to have a method for assigning multicast users to either dedicated or broadcast channel that minimizes the power required by the base station for supporting multimedia broadcast multicast services.

DESCRIPTION OF THE PREFERRED EMBODIMENT

Figure 1:
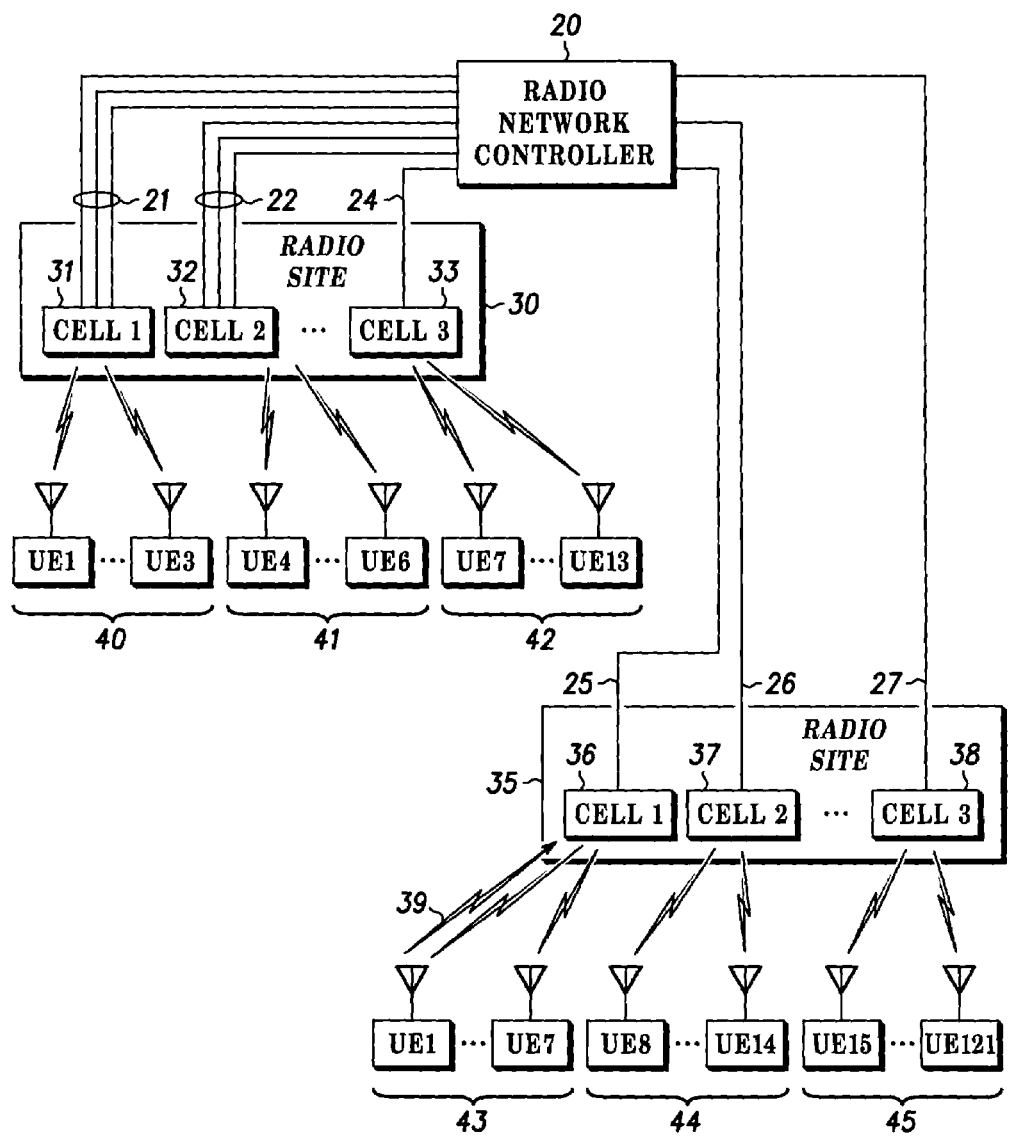
FIG. 1 is a block diagram of a mobile telecommunication system including a radio network controller in accordance with the present invention.

Referring to FIG. 1, a mobile telecommunication network 10 is shown. The radio network of the mobile telecommunication system 10 includes a radio network controller 20 and Node Bs 30 and 35. Radio network controller (RNC) 20 is coupled to radio sites or Node Bs (several Node B N-base stations (Node B)) 30 and 35 by a number of links 21, 22, 24–27. Radio network controller (RNC) 20 controls the switching between Node Bs 30 and 35 and other telecommunication systems or networks (not shown). Node Bs 30 and 35 are each shown, by example, as having three cells, although many more cells may be served by each Node B.

Each Node B 30 and 35 includes antennas and interface equipment for coupling various user equipment (UE) 40–45 to the RNC 20 and the telecommunication networks worldwide. Cell 1 of Node B 30 has three distinct user equipments 40 coupled over the air via links 21 wirelessly to the RNC 20. Similarly, cell 2 of Node B 30 has three user equipments 41 coupled via links 22 to RNC 20. These couplings are point-to-point connections That is, one data channel exists for each user equipment from RNC 20 through Node B 30 to the particular user equipment of groups 40 or 41, for example. The wireless links from cell 31 to UEs 1–3 and cell 2 to UEs 4–6 are set up as point-to-point connections since at a particular time there may be an insufficient number of user equipments to justify a multicasting arrangement. Each of the users are assumed to be receiving multimedia broadcast services via the user equipment 40–45. Point-to-point connections as demonstrated by cells 31 and 32 to user equipments UEs 40 and 41 respectively increase the overhead on the links 20 and 21. These point-to-point connections of cells 31 and 32 to user equipments 40 and 41 are made because the number of users, three for each cell, is relatively small.

For larger groups as shown for cell 33 of Node B 30 and user equipment 42 which includes seven users, a point to multipoint configuration is shown for the multimedia broadcast. That is, since each of the user equipments 42 is receiving the same multimedia broadcast, one link between RNC 20 and cell 33 of Node B 24 is established. Similarly, for larger user equipment groups 43, 44 and 45, the RNC 20 established point-to-multipoint links 25, 26 and 27 respectively which couple the RNC 20 to cells 36, 37 and 38 of Node B 35. Cells 36, 37 and 38 then perform a point-to-multipoint broadcast to each of the user groups 43, 44 and 45 respectively. User equipment 43 includes seven user equipments, user group 44 includes seven user equipments and user group 45 includes seven user equipments. The point-to-multipoint broadcasting achieves certain economies if the number of user equipments is relatively high.

For Node B 30 there were three links or transport bearers in each group 21 and 22 and a point-to-multipoint link 24 for a total of seven transport bearer links. This is contrasted with three transport bearer links 25–27 shown coupling RNC 20 to Node B 35. As a result of the point-to-multipoint configuration more user equipments were served twenty-one versus thirteen in Node B 30. Furthermore, bandwidth consumed by the transport bearer links 21–24 and 25–27 shows a reduction of about 50% in the configuration depicted by Node B 35 and user equipments 43–45 over Node B 30 and user equipments 40–42.

Figure 2:
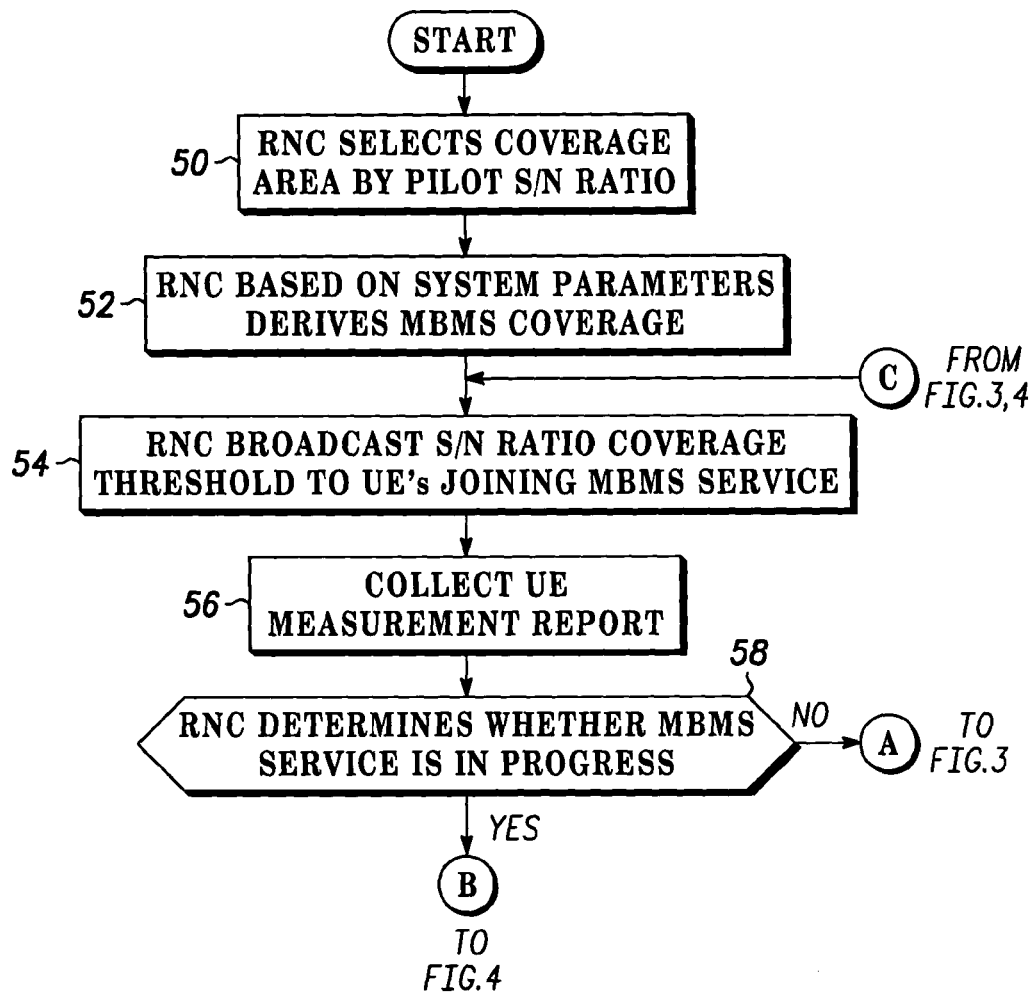
FIGS. 2–4 are a flow chart for power allocation for a radio network controller in accordance with the present invention.
Figure 3:
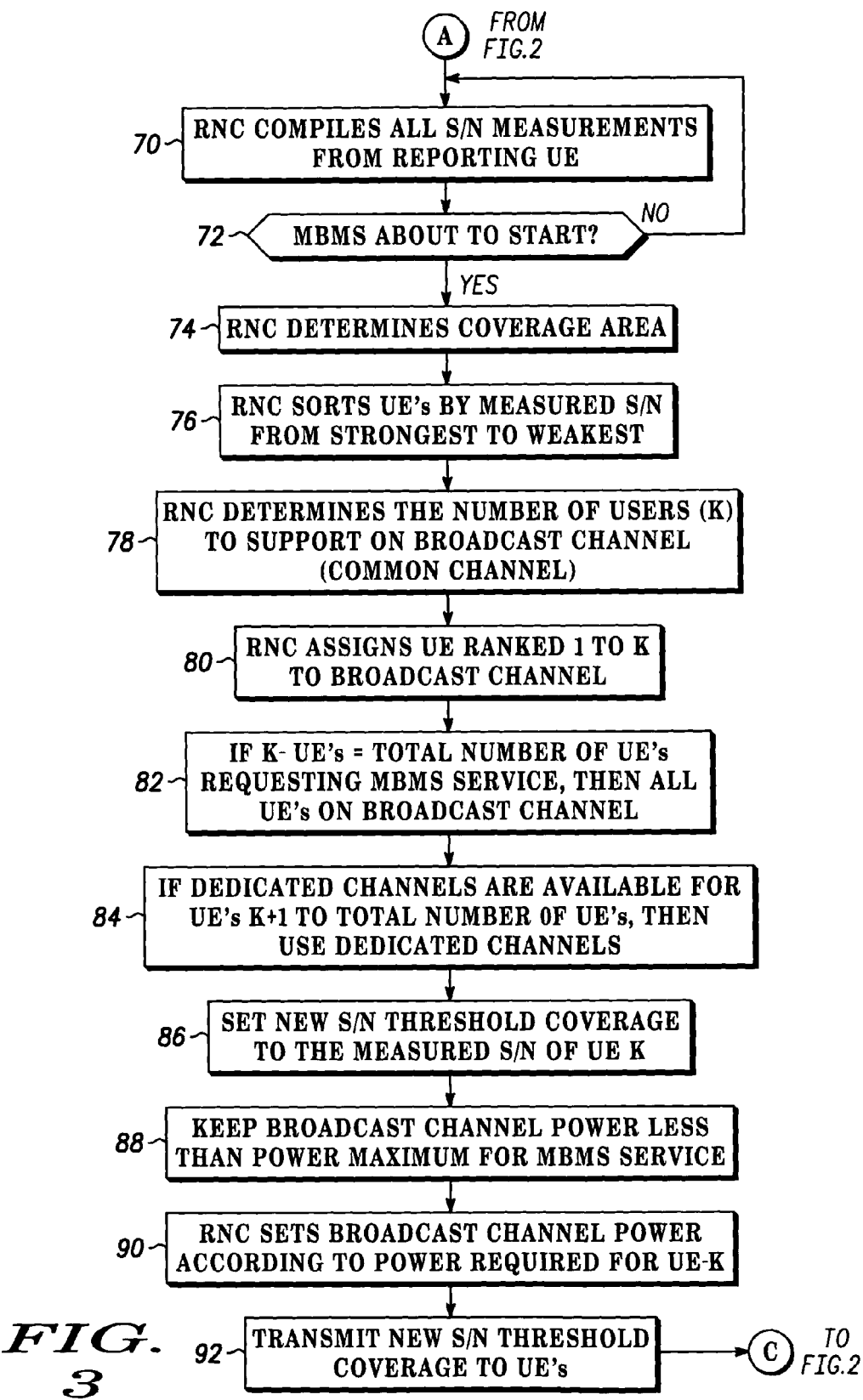
Figure 4:
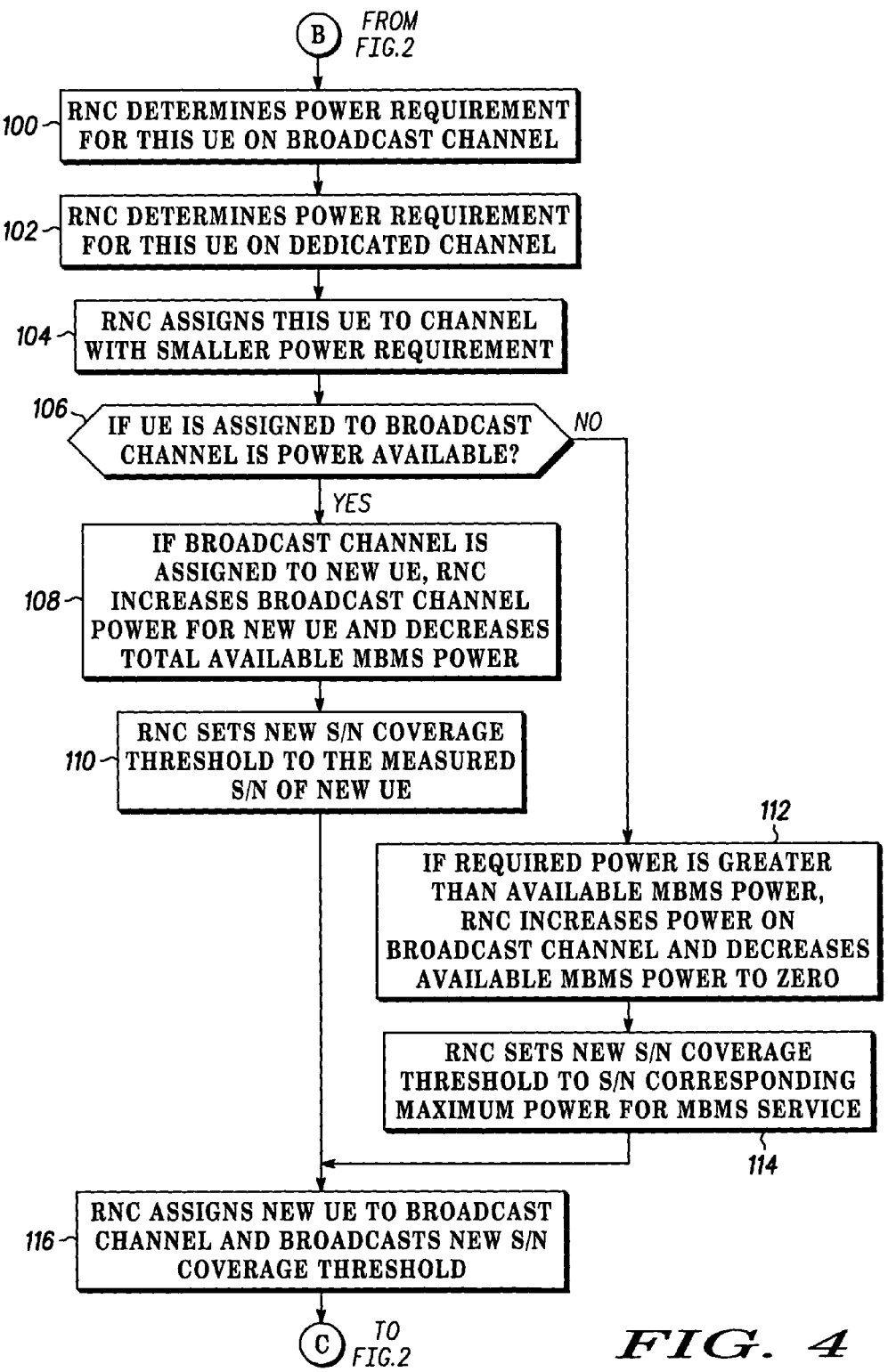

In a preferred embodiment this method uses common channel and dedicated channels simultaneously with a power allocation method that corresponds to the propagation environment and location (geometry) of the user equipment. This method minimizes the power allocation requirement of the broadcast channel by using parameter of cell size and propagation environment. Since the broadcast channel provides only partial coverage of the cell, the user equipment is configured with the parameters defining the coverage area. Then the user equipment notifies the RNC when the user equipment is outside the coverage area. In response, the radio network controller (RNC) either modifies the coverage area or allocates dedicated channel resources to provide the multicast services depending on the location of other user equipment (UE) which subscribes to this service. This method allows a network operator the flexibility to set the percentage of area coverage for a cell where the broadcast channel will be received reliably while reducing the interference in a soft handoff (SHO) region. This method is particularly well suited for mobile telecommunication systems which are populated by relatively low mobility users. Referring to FIGS. 2–4 a flow chart of a power allocation method performed by the radio network controller (RNC) is shown. The goal is to assign users to the common or dedicated channel in order to minimize the total transmit power.

$$P_B + \sum_{i=1}^{K} P_i \leq P_{EDGE} \qquad \text{Equation I}$$

$P_B$ Power allocated to the broadcast channel for the partial cell coverage $P_i$ Power allocated to the dedicated channel in SHO $P_{EDGE}$ Power required for the common channel to the edge of the cell For common channel power allocation the power allocation method is started and block 50 is entered. The radio network controller (RNC) 20 selects a default coverage area for the multimedia broadcast multicast service. Then based on system parameters such as the total system power available, the power is allocated to the MBMS function by the network operator. The RNC derives the MBMS coverage threshold, block 52. Next, the RNC broadcasts the coverage or SNR threshold to the user equipments 40–45 which are joining the MBMS service, block 54.

Figure 5:
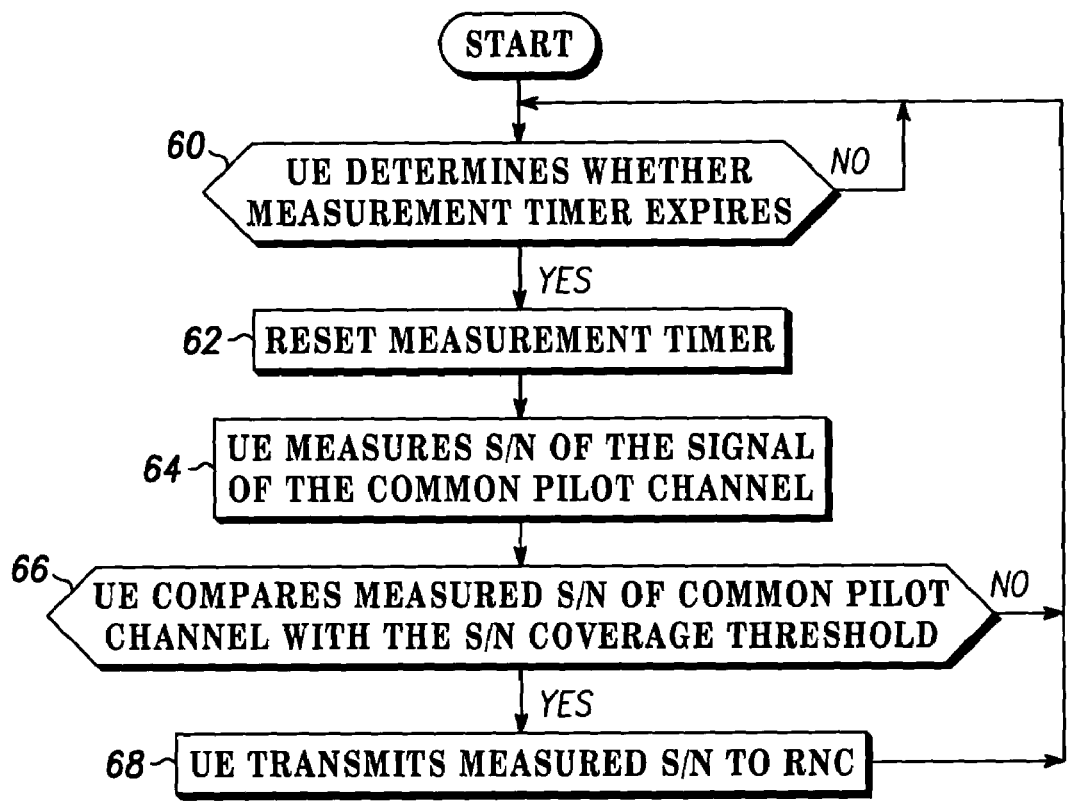
FIG. 5 is a flow chart for power allocation for a user equipment in accordance with the present invention.

The user equipments that joined the MBMS service will measure the S/N based on the received pilot signal and compares to the broadcast SNR threshold. Referring to FIG. 5, a user equipment portion of the power allocation method is shown. Once the RNC has sent the coverage threshold to the UE, the method as described in FIG. 5 is started by each UE. First, each user equipment determines whether a measurement timer has expired, block 60. If the measurement timer has not expired, control is transferred via the no path block back to block 60 to check again. If the measurement timer has expired, block 60 transfers control to block 62 via the yes path.

Block 62 resets the measurement timer of the UE. Next the UE measures the S/N of the signal on the common pilot channel, block 64. Then each UE compares the measured S/N of the common pilot channel with the S/N of the coverage threshold transmitted by the RNC. If the measured S/N is not less than the S/N of the coverage threshold, block 66 transfers control via the no path back to block 60 to iterate the process. If the measured S/N of the common pilot channel is less than the S/N of the coverage threshold, block 66 transfers control to block 68 via the yes path. Lastly, each UE then transmits the measured S/N of the common pilot channel back to the RNC, block 68. The process is then iterated.

Referring again to FIGS. 2–4, block 56 collects the measurements reported by each of the UEs as to the measured S/N of the common pilot channel signal. Block 56 receives the measured pilot channel signal via a dedicated channel or a random access channel depending upon the state of the UE.

Next block 58 determines whether the MBMS service is in progress. If the MBMS service is not in progress, block 58 transfers control to block 70 via the no path.

Next the RNC compiles all the S/N measurements from each of the UEs wishing to join the MBMS service, block 70. Next, block 72 determines whether MBMS service is about to begin. If not, block 72 transfers control back to block 70 to iterate the compilation of the received signal to noise ratios from subscribing UE's. If MBMS service is about to begin, block 72 transfers control to block 74 via the yes path.

Then the RNC determines the coverage area for MBMS services, block 74. Then the RNC sorts the measured S/N of each of the UEs from strongest to weakest measured signal, block 76.

Then the RNC determines the number of users (K) to support on the broadcast or common channel by Equation II, block 78.

$$K = \arg\max_{k}\left(P_B(N_{UE}) - P_B(k) - \left(\sum_{i=k+1}^{N_{UE}} P_i\right)\right) \qquad \text{Equation II}$$

where $P_B(k)$ is the required power of the broadcast channel to support user k, and $P_i$ is the required power to support user i using a dedicated channel. $N_{ue}$ is the total number of UEs requesting MBMS services. K+1 is the identity of the UE with the S/N which is unable to be supported on the broadcast channel.

Next, the RNC assigns UEs ranked 1 through K to the broadcast channel, block 80. This ranking is based upon the reported and measured S/N of the common channel pilot signal. If K user equipments are the total number of UEs requesting MBMS service, all the UEs will be assigned by the RNC to the broadcast channel, block 82.

Next, the RNC determines whether there are sufficient dedicated channels for users K+1 through the total number of user equipments requesting MBMS service. If there are sufficient dedicated channels the balance of the users greater than K are assigned dedicated channels, block 84. Next, the RNC sets a new S/N coverage threshhold to be the measured S/N of the Kth user equipment, block 86. Next, the RNC retains the broadcast channel power to be less than the maximum power allocated for MBMS services by the network operator, block 88. The RNC next sets the broadcast channel power according to the power required for the Kth UE, block 90. The additional power which is available for MBMS service is then given by Equation III.

$$P_{B,AVAIL} = P_{B,MAX} - \left(\sum_{i=K+1}^{N_{UE}} P_i\right) - P_B(K) \qquad \text{Equation III}$$

where $P_{B,MAX}$ is the maximum power that may be assigned to the MBMS broadcast channel (normally assigned by the operator). This maximum is usually the power required to cover the entire cell. $N_{ue}$ is the total number of UEs requesting MBMS services. K+1 is the identity of the UE with the S/N which is unable to be supported on the broadcast channel.

Lastly, the RNC transmits the new S/N coverage threshold to each of the requesting user equipments, block 92. Then control is transferred to block 54.

Referring again to FIG. 2, if the MBMS service is in progress, block 58 transfers control via the yes path to block 100. If the MBMS service is in progress the particular UE requesting to be added to the service may require additional power. Depending on the power requirement of this particular UE the RNC may not be able to service the request. Next, the RNC determines the power requirement for this particular UE which is requesting MBMS service on the broadcast channel, block 100. Next, the RNC determines the power requirements for this particular UE on a dedicated channel, block 102. The RNC then assigns the newly requesting UE to a channel with smaller power requirement, block 104. That is either the broadcast channel or a dedicated channel is assigned based upon which channel will require less power to provide the MBMS service to the new UE.

Next, block 106 determines whether the particular UE is assigned to the broadcast channel with sufficient power available. If the UE is assigned to the broadcast channel with sufficient power, block 106 transfers control to block 108 via the yes path. Then the RNC increases broadcast channel power for the new UE and correspondingly decreases the total available power for MBMS services, block 108. For increasing the broadcast channel power Equation IV is used.

$$P_B(K) = P_B(K) + P_{\Delta B}(i) \qquad \text{Equation IV}$$

For decreasing the total available MBMS power, this is performed by setting the power according to Equation V.

$$P_{B,AVAIL} = P_{B,AVAIL} - P_{\Delta B}(i) \qquad \text{Equation V}$$

The RNC sets the S/N for the coverage threshold to the measured S/N of the new UE, block 110.

Lastly, the RNC assigns the new UE to the broadcast channel and broadcasts a new S/N coverage threshold to each of the UEs receiving the MBMS service, block 116.

If there is insufficient power on the broadcast channel to assign the new UE, block 106 transfers control to block 112 via the no path. If the required power for the new UE is greater than the available MBMS power, the RNC increases the power on the broadcast channel and decreases the available MBMS power to zero, block 112. For increasing the power according to block 112 the Equation VI is used to make the determination.

$$P_B(K) = P_B(K) + P_{B,AVAIL} \qquad \text{Equation VI}$$

For decreasing the available MBMS power, Equation VII is performed.

$$P_{B,AVAIL} = 0 \qquad \text{Equation VII}$$

Next, the RNC sets the new S/N coverage threshold to the S/N corresponding to the maximum power for the MBMS service allowed by the system operator, block 114.

Lastly, the RNC assigns the new UE to the broadcast channel and broadcasts a new S/N coverage threshold to all of the UEs, block 116. Then block 116 transfers control to block 54 (FIG. 2).

In previous technology for implementing broadcast channels for MBMS services, power sufficient for the broadcast channel was required to the edge of each cell. This put a tremendous burden on the power allocated for the MBMS function and for the overall power of a mobile telecommunication system and network.

In an embodiment of this invention, partial broadcast channel coverage is provided thereby significantly reducing the power required for the broadcast channel. Dedicated channels are assigned to user equipment which is on the edge or fringe of a cell. Using an embodiment of the present invention for providing an 80% MBMS service coverage area within a cell only uses about 2.5% of the total Node B's power.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A power allocation and user assignment method for multimedia broadcast multicast services (MBMS services) in a mobile communication system, the power allocation and user assignment method comprising the steps of:

transmitting a pilot signal to a plurality of user equipments;

collecting by a radio network controller (RNC) of the mobile communication system a signal/noise ratio (S/N) of the pilot signal as received by the plurality of user equipments; sorting by the RNC the plurality of user equipments by the strength of the S/N of the pilot signal from a strongest pilot signal to a weakest pilot signal;

determining a number (K) of a particular user equipment of the plurality of user equipments to support on a broadcast channel;

determining by the RNC a coverage area within the cell for the MBMS services; and assigning a portion of the plurality of user equipments, one through K, to the broadcast channel, wherein the step of determining the number K includes a step of:

$$K = \arg\max_k \left( P_B(N_{UE}) - P_B(k) - \left( \sum_{i=k+1}^{N_{UE}} P_i \right) \right)$$

wherein $P_B(k)$ is the required power allocation of the broadcast channel to support user k, $P_B(N_{UE})$ is the total power allocation required to cover all users using the broadcast channel and $P_i$ is the required power to support user i using a dedicated channel.

2. A power allocation and user assignment method for multimedia broadcast multicast services (MBMS services) in a mobile communication system, the power allocation and user assignment method comprising the steps of:

transmitting a pilot signal to a plurality of user equipments;

sorting each of the plurality of user equipments by a strength of the pilot signal;

determining a number (K) of a particular user equipment of the plurality of user equipments to support on a broadcast channel; and assigning a portion of the plurality of user equipments, one through K, to the broadcast channel, wherein the step of determining the number K includes a step of:

$$K = \arg\max_k \left( P_B(N_{UE}) - P_B(k) - \left( \sum_{i=k+1}^{N_{UE}} P_i \right) \right)$$

wherein $P_B(k)$ is the required power allocation of the broadcast channel to support user k, $P_B(N_{UE})$ is the total power allocation required to cover all users using the broadcast channel and $P_i$ is the required power to support user i using a dedicated channel.

* * * * *